United States Patent
Anderson et al.

(10) Patent No.: US 8,675,615 B2
(45) Date of Patent: Mar. 18, 2014

(54) TEMPERATURE-DRIVEN AIRLINK SELECTION IN A MULTI-MODE WIRELESS DEVICE

(75) Inventors: Jon James Anderson, Boulder, CO (US); Joshua D. Thielen, San Diego, CA (US); Sumit Sur, Boulder, CO (US); Jeffrey A. Niemann, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 13/100,161

(22) Filed: May 3, 2011

(65) Prior Publication Data
US 2012/0281558 A1 Nov. 8, 2012

(51) Int. Cl.
H04J 3/00 (2006.01)
H04W 36/18 (2009.01)
H04W 88/06 (2009.01)

(52) U.S. Cl.
CPC .............. *H04W 36/18* (2013.01); *H04W 88/06* (2013.01)
USPC ........................................................ 370/337

(58) Field of Classification Search
CPC .................................................. H04W 36/14
See application file for complete search history.

(56) References Cited

U.S. PATENT DOCUMENTS

| | | | |
|---|---|---|---|
| 5,519,886 A | 5/1996 | Gilbert et al. | |
| 2007/0142058 A1 | 6/2007 | Matsumura et al. | |
| 2008/0102815 A1* | 5/2008 | Sengupta et al. | 455/424 |
| 2009/0068969 A1 | 3/2009 | Lindoff et al. | |
| 2010/0330950 A1* | 12/2010 | Wells et al. | 455/404.1 |
| 2013/0078977 A1* | 3/2013 | Anderson et al. | 455/418 |

FOREIGN PATENT DOCUMENTS

EP 0800282 A2 10/1997

OTHER PUBLICATIONS

International Search Report and Written Opinion—PCT/US2012/035843, International Search Authority—European Patent Office, Aug. 8, 2012.

* cited by examiner

*Primary Examiner* — Chi Pham
*Assistant Examiner* — Kouroush Mohebbi
(74) *Attorney, Agent, or Firm* — Nicholas A. Cole (57) ABSTRACT

A method and system for temperature-driven airlink selection in a multi-mode wireless device is disclosed. The method may include monitoring a temperature in the multi-mode wireless device while the multi-mode wireless device operates in a first airlink mode, determining whether to switch the airlink mode of the multi-mode wireless device in response to a change in the monitored temperature, and switching the multi-mode wireless device to operate in a second airlink mode in response to a determination to switch the airlink mode.

44 Claims, 9 Drawing Sheets

TEMPERATURE-DRIVEN AIRLINK SELECTION IN A MULTI-MODE WIRELESS DEVICE

DESCRIPTION OF THE RELATED ART

A "wireless device," as the term is used herein, is a portable or mobile device that is capable of communicating data with a wireless network by means of radio frequency (RF) transmission. Wireless devices may include cellular telephones, portable digital assistants (PDAs), portable game consoles, palmtop computers, and other portable electronic devices.

A wireless device includes a number of electronic subsystems, one of which is the air interface or airlink subsystem. The term "air interface" or "airlink" refers to a communication link with another system that is established wirelessly, i.e., over the air, in accordance with a specific standard or protocol. Examples of such airlinks include but are not limited to: Wideband Code-Division Multiple Access ("W-CDMA"); Evolution Data-Only ("EVDO"); Global System for Mobile telecommunications ("GSM") and its data service extensions such as Enhanced Data Rates for GSM Evolution ("EDGE") and General Packet Radio Service ("GPRS"); and Long-Term Evolution ("LTE"). Different airlinks are not compatible with one another. That is, a wireless device and the base station cannot communicate unless both are configured for the same airlink.

The airlink subsystem includes RF transceiver circuitry and signal processing circuitry. The signal processing circuitry performs processes such as upconverting and downconverting the RF signal to and from radio frequencies and controlling signal modulation, demodulation and coding that together characterize the RF signal. Some of the signal processing is typically performed in the analog domain, and other portions in the digital domain (e.g., by a programmable processor under control of software or firmware).

The term "multi-mode wireless device" as used herein refers to a wireless device that includes reconfigurable processing elements (which may include hardware, software or a combination thereof) in the airlink subsystem that allow the airlink to be changed during operation of the wireless device. That is, the wireless device can at times communicate via one airlink and at other times communicate via a different airlink. The airlink can be switched by a processor in response to changing operating conditions. For example, a multi-mode wireless device can facilitate roaming between two geographic regions in which a single airlink is not available through service providers in both regions. Thus, when a multi-mode wireless device is operating in a first such region, it communicates via a first airlink, and when the multi-mode wireless device is operating in a second such region, it communicates via a second airlink. For example, consider an instance in which W-CDMA airlink service is provided in a first geographic region but LTE airlink service is not provided in the first region, while LTE airlink service is provided in a second geographic region but W-CDMA airlink service is not provided in the second geographic region. A dual-mode wireless device that is capable of switching between W-CDMA and LTE modes can switch to the W-CDMA mode when the wireless device is roaming in the first region and switch to LTE mode when the wireless device is roaming in the second region. The terms "airlink," "mode" and "airlink mode" are used synonymously herein.

Some airlinks feature operating parameters that can be changed dynamically in the wireless device. For example, some airlinks allow the wireless device to change the rate at which it transmits information. Data service enhancements such as EDGE and GPRS feature rate adaptation algorithms that adapt the modulation and coding scheme according to the quality of the radio channel, and thus the bit rate and robustness of data transmission. Thus, if the processor determines that channel quality is high, the processor can adjust the modulation and coding scheme or other operating parameters to take advantage of the high channel quality to maximize information throughput. Conversely, if the processor determines that channel quality is low, the processor can adjust the modulation and coding scheme or other operating parameters to maximize information integrity. Such adjustments are sometimes referred to as Quality of Service (QoS) adjustments. It has also been suggested to adjust operating parameters of an airlink for the purpose of conserving power.

In operation, the electronic circuitry within a wireless device generates heat, which at excessive levels may be detrimental to the circuitry. The amount of heat that is generated may vary depending upon the operating conditions. For example, a wireless device transmitting data for a sustained time period at a high power level may generate a large amount of heat. Some wireless devices include thermal sensors that a processor may monitor to determine if the wireless device has reached a threshold or critical temperature above which the electronic circuitry may be harmed. It has been suggested that, when a reading of the thermal sensor indicates that a wireless device has reached such a threshold temperature, the processor may adjust operating parameters of an airlink to attempt to reduce the amount of heat that is generated.

SUMMARY OF THE DISCLOSURE

In one aspect, a method for temperature-driven airlink selection in a multi-mode wireless device is disclosed and may include monitoring a temperature in the multi-mode wireless device while the multi-mode wireless device operates in a first airlink mode, determining whether to switch the airlink mode of the multi-mode wireless device in response to a change in the monitored temperature, and switching the multi-mode wireless device to operate in a second airlink mode in response to a determination to switch the airlink mode.

In another aspect, a computer system for temperature-driven airlink selection in a multi-mode wireless device is disclosed. The system may include a processor operable to monitor a temperature in the multi-mode wireless device while the multi-mode wireless device operates in a first airlink mode, determine whether to switch the airlink mode of the multi-mode wireless device in response to a change in the monitored temperature, and switch the multi-mode wireless device to operate in a second airlink mode in response in response to a determination to switch the airlink mode.

Further, the computer system for temperature-driven airlink selection in a portable computing device may include means for monitoring a temperature in the multi-mode wireless device while the multi-mode wireless device operates in a first airlink mode, means for determining whether to switch the airlink mode of the multi-mode wireless device in response to a change in the monitored temperature, and means for switching the multi-mode wireless device to operate in a second airlink mode in response to a determination to switch the airlink mode.

In still another aspect, a computer program product is disclosed and may include a computer-usable medium having computer-readable program code embodied therein. The computer readable program code may be adapted to execute and to implement a method for temperature-driven airlink selection in a multi-mode wireless device. The method implemented by the code may include monitoring a temperature in the multi-mode wireless device while the multi-mode wireless device operates in a first airlink mode, determining whether to switch the airlink mode of the multi-mode wireless device in response to a change in the monitored temperature, and switching the multi-mode wireless device to operate in a second airlink mode in response to a determination to switch the airlink mode.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 3B is a conceptual illustration of the multi-mode wireless device of FIG. 4A after switching the airlink mode.

DETAILED DESCRIPTION

The word "exemplary" or "illustrative" is used herein to mean "serving as an example, instance, or illustration." Any aspect described herein as "exemplary" or "illustrative" is not necessarily to be construed as preferred or advantageous over other aspects.

In this description, the terms "communication device," "wireless device," "wireless telephone," "wireless communication device" and "wireless handset" are used interchangeably. With the advent 3G and 4G wireless technology, greater bandwidth availability has enabled more portable computing devices with a greater variety of wireless capabilities. Therefore, a wireless device could be a cellular telephone, a satellite telephone, a pager, a personal digital assistant (PDA), a smartphone, a navigation device, a smartbook or reader, a media player, or a computer with a wireless connection.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein may also include files that are not executable in nature, such as documents that may need to be opened or other data files that need to be accessed.

As used in this description, the terms "component," "database," "module," "system," and the like are intended to refer to a computer-related entity or element, either hardware, firmware, a combination of hardware and software, software, or software in execution. For example, a component may be, but is not limited to being, a processor, a process running on a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
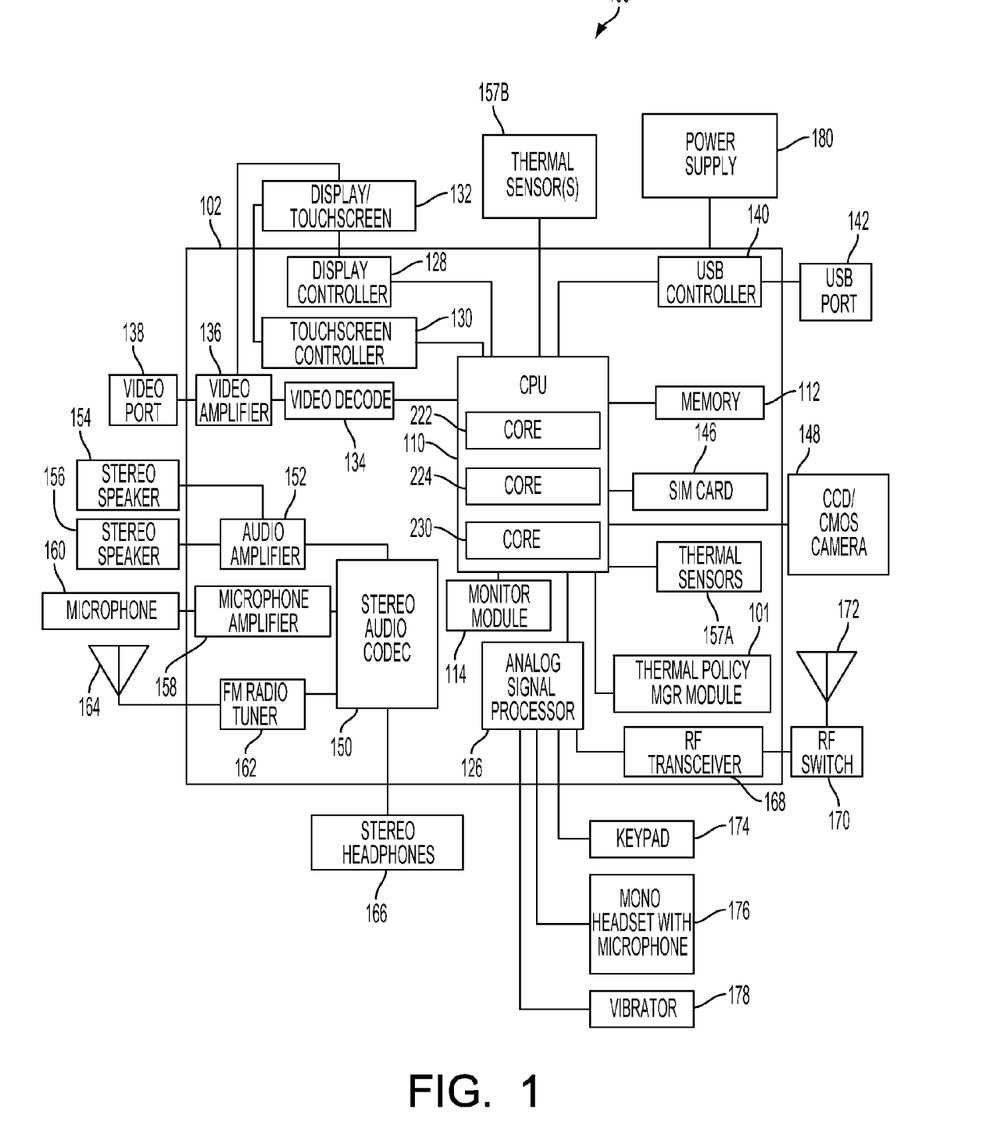
FIG. 1 is a functional block diagram illustrating an exemplary embodiment of a multi-mode wireless device.

In FIG. 1, an exemplary multi-mode wireless device 100 in the form of a wireless telephone or handset in which methods and systems for temperature-driven airlink selection are implemented is illustrated through an exemplary, non-limiting functional block diagram. As shown, the multi-mode wireless device 100 includes an on-chip system 102 that includes a multi-core central processing unit ("CPU") 110 and an analog signal processor 126 that are coupled together. The CPU 110 may comprise one or more cores 222, 224, 230, etc. The cores 222, 224, 230, etc., may be integrated on a single integrated circuit die, or in other embodiments they may be integrated or coupled on separate dies in a multiple-circuit package. The cores 222, 224, 230, etc., may be coupled via one or more shared caches, and they may implement message or instruction passing via network topologies such as bus, ring, mesh and crossbar topologies. In other embodiments, instead of a CPU 110 a digital signal processor ("DSP") may also be employed, as understood by one of ordinary skill in the art.

As understood by one of ordinary skill in the art, the above-described electronic elements and others produce heat during operation. Excessive heat may be detrimental to the electronic elements of multi-mode wireless device 100. The multi-mode wireless device 100 is capable of operating in any selected one of two or more airlink modes. Operation in some of the airlink modes produces more heat than operation in others of the airlink modes. For example, the multi-mode wireless device 100 may be capable of operating at times in W-CDMA mode and at other times in LTE mode, and it is known that operation in LTE mode produces, on average, more heat than operation in W-CDMA mode, due to the more intensive computational processing (e.g., coding) that the CPU 110 performs when the multi-mode wireless device 100 is operating in LTE mode. The amount of heat produced by the multi-mode wireless device 100 is related to the amount of power it consumes. Therefore, the phrase "more power intensive" (or, equivalently, "less power efficient") may be used herein to describe a mode in which the multi-mode wireless device 100 generates more heat than in a less power-intensive mode. It should be noted that although operation in some modes may result in transmission of information with less energy per transmitted bit than in other modes, it is the aggregate energy consumed by the multi-mode wireless device 100 over a typical transmission time interval, not necessarily the energy per bit, that causes the multi-mode wireless device 100 or portions thereof to become hot. That is, for a given amount of data to be transmitted, temperatures in the multi-mode wireless device 100 will be higher in an instance in which the multi-mode wireless device 100 transmits the data in a more power-intensive mode than in a less power-intensive mode.

The CPU 110 may also be coupled to one or more internal, on-chip thermal sensors 157A as well as one or more external, off-chip thermal sensors 157B (collectively referred to as sensors 157). The on-chip thermal sensors 157A may comprise one or more proportional-to-absolute temperature ("PTAT") temperature sensors that are based on a vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter controller (not shown). However, other types of thermal sensors 157 may be employed without departing from the scope of the invention. The thermal sensors 157 may be distributed throughout the on-chip system 102 such that they may sense the heat emitted by various electronic circuit elements.

The thermal sensors 157 may be controlled and monitored by one or more thermal policy manager modules 101. The one or more thermal policy manager modules may comprise software which is executed by the CPU 110. However, a thermal policy manager module 101 may also be formed from hardware and/or firmware without departing from the scope of the invention.

In general, a thermal policy manager module 101 may be responsible for monitoring and applying thermal policies that include one or more mode selection methods that may help the multi-mode wireless device 100 manage thermal conditions and/or thermal loads and avoid experiencing adverse thermal conditions, such as, for example, reaching critical temperatures, while maintaining a high level of functionality.

FIG. 1 also shows that the multi-mode wireless device 100 may include a monitor module 114. The monitor module 114 communicates with one or more of the thermal sensors 157 and with the CPU 110 as well as with the thermal policy manager module 101. The thermal policy manager module 101 may work with the monitor module 114 to identify adverse thermal conditions and apply thermal policies that include one or more mode-selection thermal mitigation methods as described in further detail below.

The method steps described herein may be implemented in whole or part by executable instructions stored in a memory 112 that form the one or more thermal policy manager modules 101. These instructions that form the thermal policy manager modules 101 may be executed by the CPU 110, the analog signal processor 126, or another processor or circuit element, to perform the methods described herein. Further, the processors 110 and 126, the memory 112, the instructions stored therein, or a combination thereof may serve as a means for performing one or more of the method steps described herein.

As illustrated in FIG. 1, the multi-mode wireless device 100 further includes a display controller 128 and a touchscreen controller 130 that are coupled to the digital signal processor 110. A touchscreen display 132 external to the on-chip system 102 is coupled to the display controller 128 and the touchscreen controller 130. The multi-mode wireless device 100 also includes a video decoder 134, a video amplifier 136 and a video port 138. The video decoder 134 is coupled to the CPU 110. The video amplifier 136 is coupled to the video decoder 134 and the touchscreen display 132. The video port 138 is coupled to the video amplifier 136. A universal serial bus ("USB") controller 140 is also coupled to the CPU 110. Also, a USB port 142 is coupled to the USB controller 140. The memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio coder-decoder ("CODEC") 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

As further shown in FIG. 1, a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable direct current ("DC") battery or a DC power supply that is derived from an alternating current ("AC")-to-DC transformer that is connected to an AC power source.

The touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102 in the exemplary embodiment shown in FIG. 1. However, it should be understood that the monitor module 114 may also receive one or more indications or signals from one or more of these external devices by way of the analog signal processor 126 and the CPU 110 to aid in the real-time management of the resources operable on the multi-mode wireless device 100.

The airlink mode-switching thermal management methods described herein may be effected through the thermal policy manager module 101 or, alternatively or in addition, through the execution of software by the CPU 110. The various thermal sensors 157 may be positioned sufficiently adjacent to and in sufficient thermal connection with various hardware elements of the multi-mode wireless device 100, such as, for example, the CPU 110, the RF transceiver 168, and the RF switch 170, so that the hardware element associated with the sensed heat may be identified.

Figure 2:
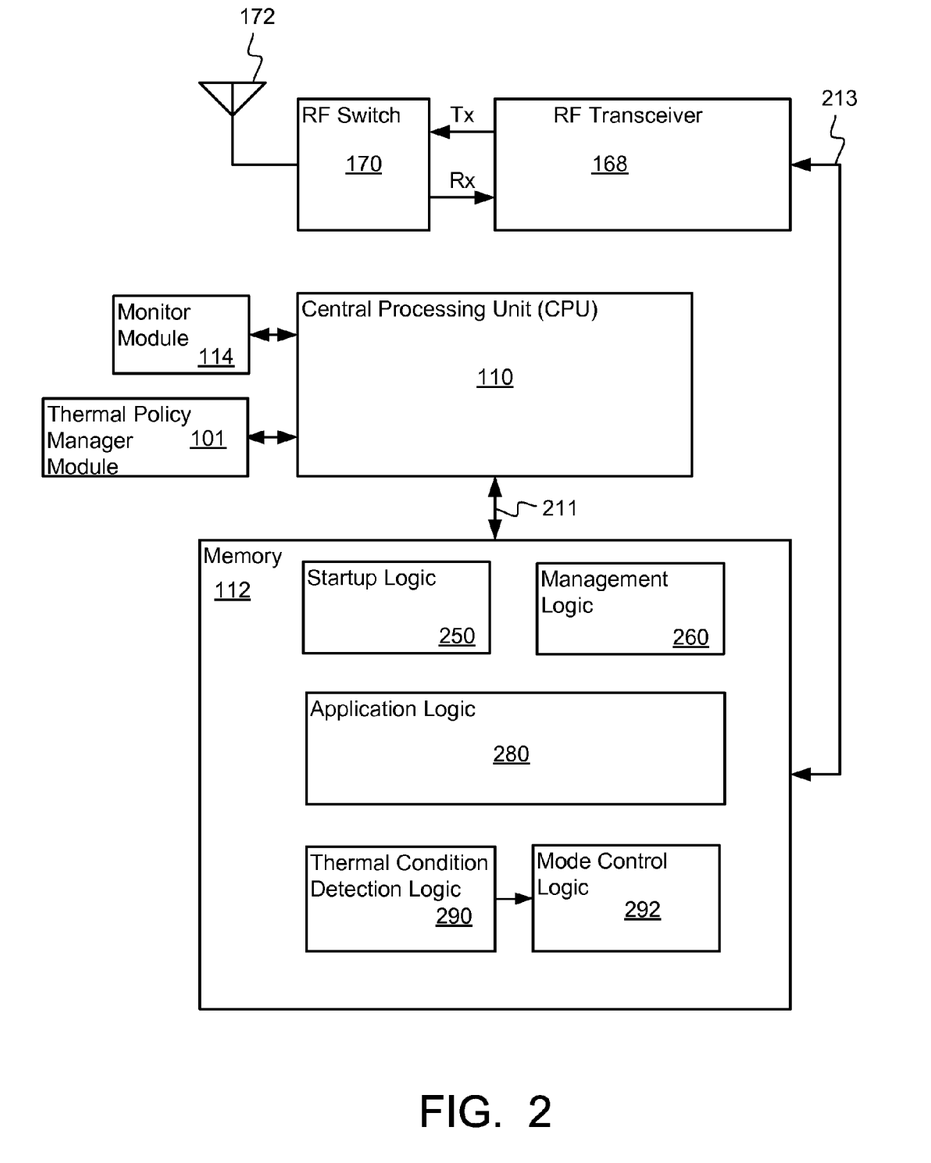
FIG. 2 is a block diagram showing processing and transceiver elements of the multi-mode wireless device of FIG. 1.

As illustrated in FIG. 2, the CPU 110 is coupled to the memory 112 via a bus 211. The CPU 110 may receive commands from the thermal policy manager module 101, which may be embodied in hardware, software or a combination thereof. Software embodying the thermal policy manager module 101 may comprise instructions that are executed by the CPU 110. A process defined by the execution of such instructions by the CPU 110 may cause commands to be issued to other processes or application programs being executed by the CPU 110 or to other cores or processors.

The RF transceiver 168 is coupled to the memory 112 via bus 213. The RF transceiver 168 may include one or more processors (not shown). The CPU 110 coordinates the transfer of information in digital form from the memory 112 to the RF transceiver 168 via bus 213. Some of the transferred information represents information to be wirelessly transmitted via the RF transceiver 168.

Each of buses 211 and 213 may include multiple communication paths via one or more wired or wireless connections, as is known in the art. The buses 211 and 213 may have additional elements, which are not shown for purposes of clarity, such as controllers, buffers (caches), drivers, repeaters, and receivers, to enable communications. Further, the bus 211 and the bus 213 may include address, control, and/or data connections to enable appropriate communications among the aforementioned components.

Memory 112 is generally of a type in which software elements, such as data and programming code, are operated upon by the CPU 110. In accordance with conventional computing principles, the CPU 110 operates under the control of programming code, such as operating system code and application program code. In the exemplary embodiment such programming code, i.e., software elements, includes startup logic 250, management logic 260, application logic 280, thermal condition detection logic 290, and mode control logic 292. Although these software elements are conceptually shown for purposes of illustration as stored or residing in memory 112, it is understood that such software elements may not reside simultaneously or in their entireties in memory 112 but rather may be retrieved in portions via the CPU 110 on an as-needed basis, e.g., in code segments, files, instruction-by-instruction, or any other suitable basis, from any of the other sources of software or firmware shown in FIG. 1, such as the thermal policy manager module 101.

It should be noted that, as programmed with the above-described software elements or portions thereof, the combination of the CPU 110, the memory 112 (or other element or elements in which software elements are stored or reside) and any related elements generally defines a programmed processor system. It should also be noted that the combination of software elements and the computer-usable medium on which they are stored or in which they reside generally constitutes what is referred to in the patent lexicon as a "computer program product."

Although the memory 112 represents an exemplary computer-usable or computer-readable medium, more generally, a computer-readable medium is an electronic, magnetic, optical, electromagnetic, or semiconductor system, apparatus, device or other physical device or means that may contain or store a computer program and data for use by or in connection with a computer-related system or method. The various logic elements shown in FIG. 2 and other such logic elements may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a computer-readable medium may include any means that may store, communicate, propagate, or transport the information for use by or in connection with the instruction execution system, apparatus, or device.

Examples (i.e., a non-exhaustive list) of computer-readable media include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Although in the exemplary embodiment the startup logic 250, management logic 260, application logic 280, thermal condition detection logic 290 and mode control logic 292 are software elements, in other embodiments they may be implemented with any or a combination of the following technologies, which are each well known in the art: a discrete logic circuit(s) having logic gates for implementing logic functions upon data signals, combination logic in an application specific integrated circuit (ASIC), a programmable gate array(s) (PGA), a field programmable gate array (FPGA), etc.

Under the control of mode control logic 292, the CPU 110 may switch the airlink mode under which the multi-mode wireless device 100 is operating to another airlink mode and otherwise select the airlink mode. Mode control logic 292 may include not only portions that relate to the mode-selection thermal mitigation methods described herein but may also include conventional portions that relate to conventional method for selecting airlink modes. As well understood by a person of ordinary skill in the art, such conventional mode selection methods may include selecting, from among a set of two or more airlink modes, an airlink mode that provides the highest quality RF signal link in communicating with a base station or other device. Such conventional airlink selection methods may also include manual selection methods in which a user instructs the multi-mode wireless device 100 to operate in an airlink mode specified by the user or within a set of airlink modes specified by the user or, conversely, to refrain from operating in one or more user-specified airlink modes.

For example, a user can instruct the multi-mode wireless device 100 to refrain from operating in LTE mode (for the purpose of, for example, conserving battery power). More typically, conventional airlink selection modes automatically select modes in accordance with a hierarchical preference scheme. For example, in an instance in which the multi-mode wireless device 100 is roaming in a geographic region in which a sufficiently high-quality RF signal link can be established with a base station, then the multi-mode wireless device 100 may select LTE mode over other modes that do not provide as high a rate of data transmission throughput as LTE mode is capable of providing. However, in an instance in which the multi-mode wireless device 100 is roaming in a geographic region in which no base stations exist that provide LTE mode or in which only an unacceptably low-quality RF signal link can be established with a base station in LTE mode, then the multi-mode wireless device 100 may select an alternative mode that may not be capable of providing as high a rate of data transmission throughput. As such conventional mode-selection methods are well understood by a person of ordinary skill in the art, they are not described in further detail herein.

The portions of mode control logic 292 that relate to the mode-selection thermal mitigation methods described herein are responsive to the above-referenced thermal condition detection logic 290. That is, the CPU 100, operating in accordance with both the mode control logic 292 and the thermal condition detection logic 290, may select an airlink mode from among a set of two or more selectable airlink modes that may help mitigate potentially detrimental thermal conditions, such as one or more temperatures within the multi-mode wireless device 100 that may exceed a critical threshold. As described above, operating the multi-mode wireless device 100 in some airlink modes is known to cause the multi-mode wireless device 100 or portions thereof to produce more heat than operating the multi-mode wireless device 100 in other modes. Thus, to help mitigate potentially detrimental thermal conditions, the multi-mode wireless device 100 may be switched from a more power-intensive mode to a less power-intensive mode. Note that the one or more temperatures within the multi-mode wireless device 100 may be sensed or monitored by the various thermal sensors 157 described above.

Figure 3A:
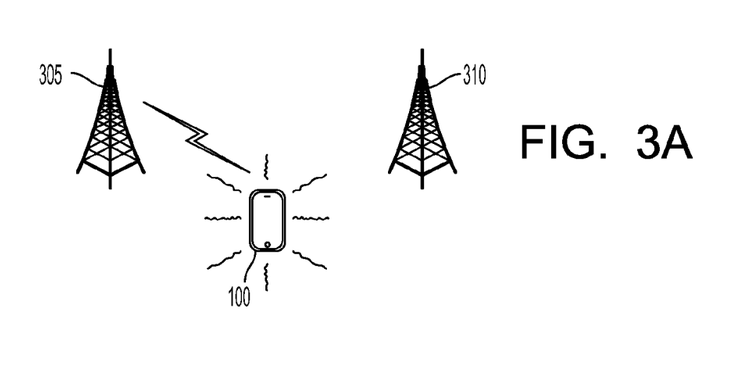
FIG. 3A is a conceptual illustration of an instance in which a monitored temperature in the multi-mode wireless device of FIG. 1 exceeds a threshold.
Figure 3B:
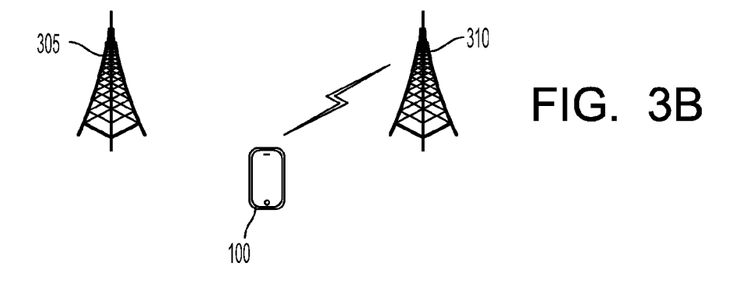
FIG. 3B is a conceptual illustration of the multi-mode wireless device of FIG. 3A after switching from a more power-intensive airlink mode to a less power-intensive airlink mode.

As illustrated in FIG. 3A, an exemplary instance in which one or more of the monitored temperatures within the multi-mode wireless device 100 exceed a threshold may define a thermal condition indicating to switch the airlink mode of the multi-mode wireless device 100. (Although the excessive heat in FIG. 3A is indicated in a conceptual manner for purposes of illustration by lines appearing to radiate from the multi-mode wireless device 100, a person of ordinary skill in the art understands that the heat may be concentrated or localized within portions of the circuitry of the multi-mode wireless device 100, such as the CPU 110 and, furthermore, may or may not radiate from the multi-mode wireless device 100 in any perceptible amount.) As illustrated in FIG. 3B, in response to such a thermal condition, the multi-mode wireless device 100 may switch from a more power-intensive mode to a less power-intensive mode. Note that although FIGS. 3A-B indicate that a first base station 305 is capable of wirelessly communicating with the multi-mode wireless device 100 via the more power-intensive airlink mode, and a second base station 310 is capable of wirelessly communicating with the multi-mode wireless device 100 via the less power-intensive mode, in other instances a single base station (not shown) may include multiple airlink systems and thus be capable of multi-mode operation, just as the multi-mode wireless device 100 is capable of multi-mode operation. Also, although the mode switching or mode selection method is described herein for purposes of clarity as being responsive to the determined thermal conditions, the mode switching or mode selection method may be responsive to additional conditions, which may or may not be thermal conditions. For example, a non-thermal condition may include RF signal link quality. As described further below, such a non-thermal condition may be represent another factor or input in the determination whether to switch the airlink mode.

Figure 4A:
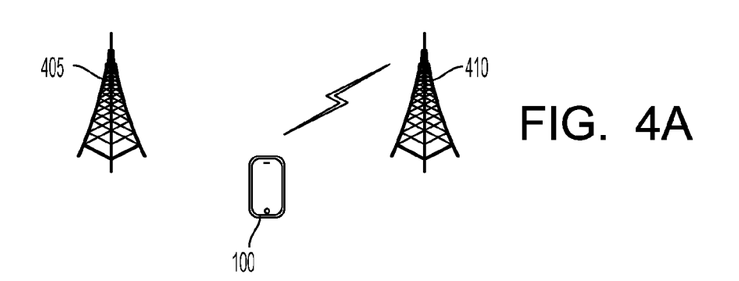
FIG. 4A is a conceptual illustration of an instance in which a monitored temperature in the multi-mode wireless device of FIG. 1 does not exceed a threshold.
Figure 4B:
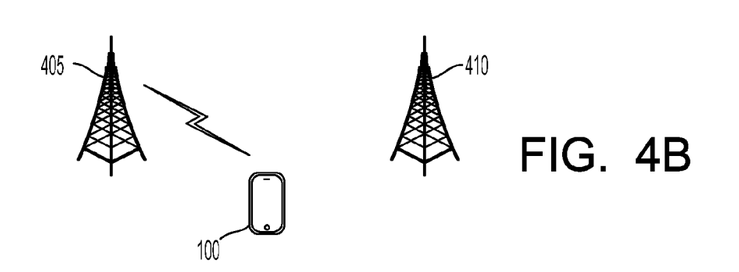

As illustrated in FIG. 4A, an exemplary instance in which one or more of the monitored temperatures within the multi-mode wireless device 100 do not exceed a threshold may define a thermal condition that does not indicate to switch the airlink mode of the multi-mode wireless device 100. In such an instance, the temperature may not be sufficiently high as to be potentially detrimental the circuitry of the multi-mode wireless device 100. Thus, as illustrated in FIG. 4B, the airlink may be switched from a first airlink (indicated in FIG. 4A for purposes of illustration as involving communication with a first base station 405) to a second airlink (indicated in FIG. 4B for purposes of illustration as involving communication with a second base station 410) in accordance with conventional methods, such as in response to RF signal link quality.

Figure 5A:
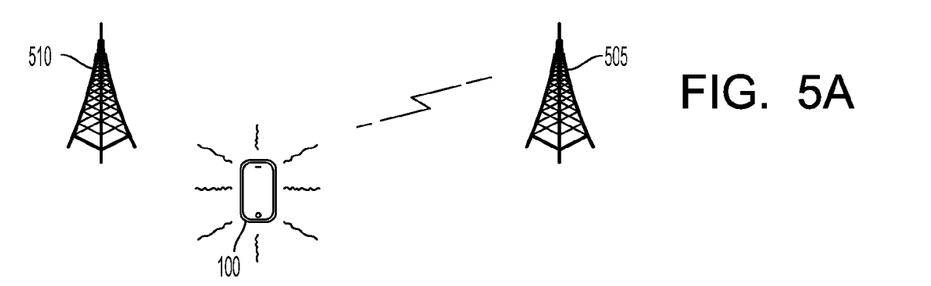
FIG. 5A is a conceptual illustration of an instance in which low airlink signal quality indicates to switch airlink modes but the monitored temperature in the multi-mode wireless device of FIG. 1 exceeds a threshold.
Figure 5B:
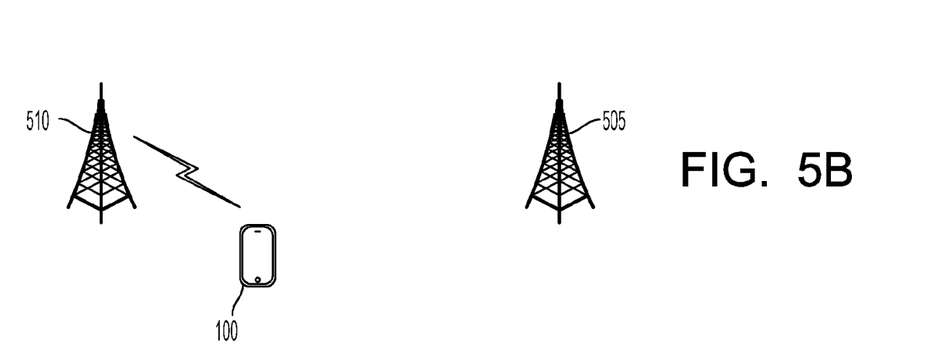
FIG. 5B is a conceptual illustration of the multi-mode wireless device of FIG. 5A after switching the airlink mode.

As illustrated in FIG. 5A, both the thermal condition and RF signal link quality (i.e., a non-thermal condition) may be involved in a mode switching method. In an exemplary instance in which one or more of the monitored temperatures within the multi-mode wireless device 100 exceed a threshold, and in which low RF signal link quality indicates switching the airlink mode, mode switching can further take into account the thermal condition, thus representing a combination of a temperature-driven method and a conventional signal quality-based method. For example, if the mode that the signal quality-based determination indicates is to be selected or switched to is more power intensive than the mode in which the multi-mode wireless device 100 is then operating, switching to the more power-intensive mode may exacerbate the thermal condition by potentially raising temperatures even further. Note that the RF signal link quality may be low despite the multi-mode wireless device 100 transmitting at a high power in an attempt to achieve a high quality RF signal link (e.g., with a more distant base station 505). The high transmission power may contribute to one or more of the monitored temperatures exceeding a threshold. In such an instance, mode switching can be modified from conventional methods by, for example, deferring or delaying mode switching for a short time interval to afford the excess heat time to dissipate or afford the RF signal link quality time to improve. Thus, for example, if the thermal condition improves, i.e., the temperature decreases, the airlink may be switched from a less power-intensive mode (indicated in FIG. 4A for purposes of illustration as involving communication with a first base station 505) to a more power-intensive mode (indicated in FIG. 4B for purposes of illustration as involving communication with a second base station 510).

Exemplary methods for temperature-driven airlink selection in a multi-mode wireless device are described below with reference to the flow diagrams of FIGS. 6-10. Although certain steps or acts in the methods or process flows described herein naturally precede others for the exemplary embodiments of the invention to function as described, the invention is not limited to the order of the steps or acts described in embodiments in which such order or sequence does not alter the functionality of the invention. That is, it is recognized that in other embodiments some steps may performed before, after, or parallel (i.e., substantially simultaneously with) other steps without departing from the scope and spirit of the invention. In other embodiments, certain steps may be omitted or not performed without departing from the invention. Also, words such as "thereafter," "then," "next," etc., are not intended to limit the order of the steps. Rather, these words are simply used to guide the reader through the description of the exemplary method. Similarly, although a step or act may be described as occurring first in the method, the method may begin at any point. A method or portion thereof may also occur repetitively or in a loop-like manner, even though it may be described only once. Each of the exemplary methods 600, 700, 800, 900 and 1000 that is described below with regard to FIGS. 6, 7, 8, 9 and 10, respectively, may be performed or may occur at any suitable time during the operation of the multi-mode wireless device 100. For example, the method may occur essentially in parallel with the wireless transmission and reception of information representing voice and data.

It should be understood that, based on these flow diagrams and associated descriptions in this specification, one of ordinary skill in the art is capable of creating or otherwise providing suitable software code or similar logic or creating or otherwise providing suitable hardware or similar logic to embody the disclosed invention without difficulty. Note that in the exemplary embodiments described herein such logic may be included in the thermal condition detection logic 290 and the mode control logic 292 (FIG. 2). Such logic may provide a means for determining a thermal condition indicating whether to switch the airlink mode of the multi-mode wireless device 100 in response to one or more monitored temperatures and a means for switching the multi-mode wireless device 100 from a first airlink mode to a second airlink mode in response to such a thermal condition. It should be noted that although exemplary methods are described herein individually for purposes of clarity, the methods may be combined with each other in whole or part.

Figure 6:
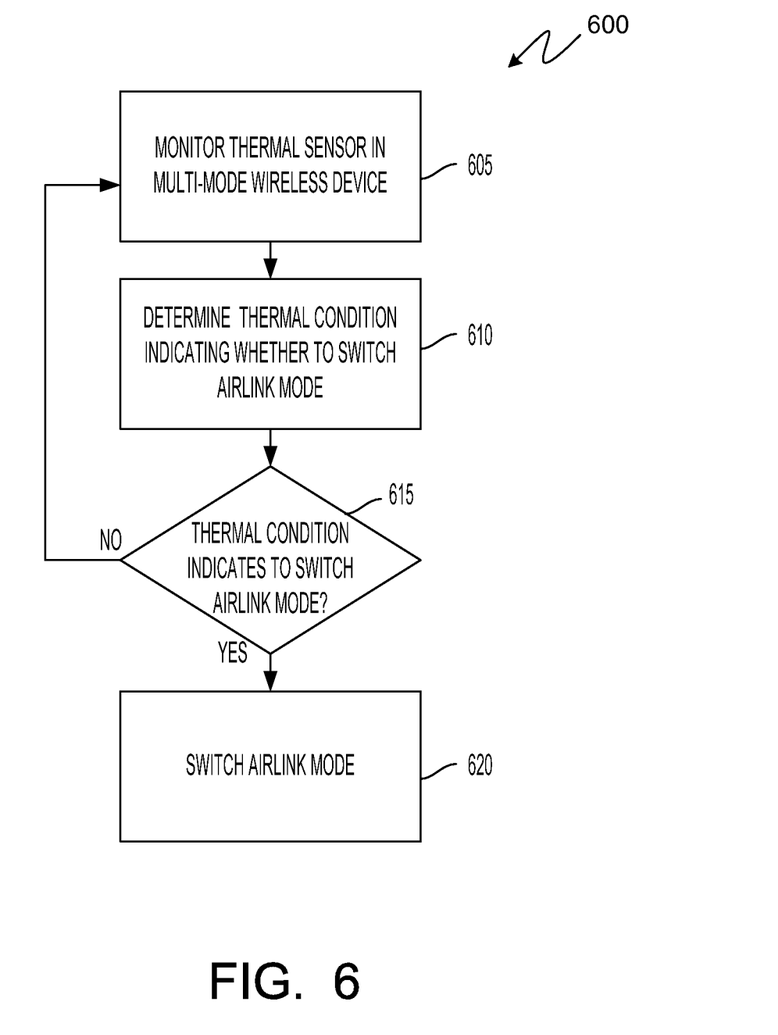
FIG. 6 is a flow diagram illustrating an exemplary method for temperature-driven airlink selection in the multi-mode wireless device of FIG. 1.

In FIG. 6, a flow diagram illustrating an exemplary method for temperature-driven airlink is shown. As indicated by block 605, at least one of the thermal sensors 157 (FIG. 1) is monitored to sense a temperature. As indicated by block 610, a thermal condition indicating whether to switch the airlink mode of the multi-mode wireless device 100 in response to the monitored temperature is determined. If, as indicated by block 615, the thermal condition indicates to switch the airlink mode, then the airlink mode is switched, as indicated by block 620. However, if the thermal condition does not indicate to switch the airlink mode, then the thermal sensors 157 continue to be monitored and a thermal condition determined as described above with regard to blocks 605, 610, etc. As will become more apparent through the additional exemplary methods described below, the term "thermal condition" as used herein may include within its scope any function that includes a monitored temperature as an input, such as, for example, a comparison between one or more temperatures and one or more threshold temperatures.

Figure 7:
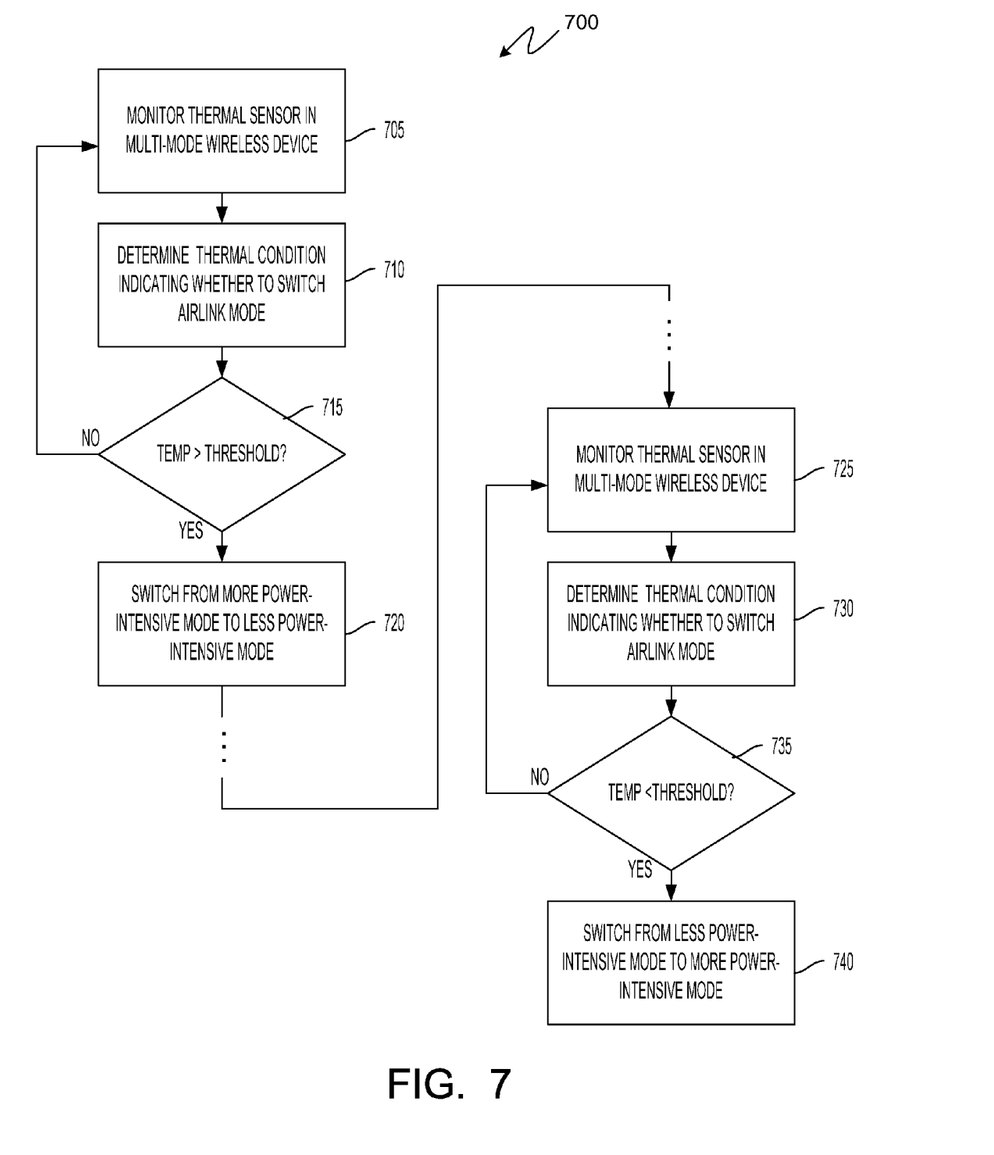
FIG. 7 is a flow diagram illustrating an exemplary method for switching between a more power-intensive airlink mode and a less power-intensive airlink mode in the multi-mode wireless device of FIG. 1 in response to temperature thresholds.

In FIG. 7, a flow diagram illustrating an exemplary method for switching between a more power-intensive airlink mode and a less power-intensive airlink mode in response to temperature thresholds is shown. As indicated by block 705, at least one of the thermal sensors 157 (FIG. 1) is monitored to sense a temperature. As indicated by block 710, a thermal condition indicating whether to switch the airlink mode of the multi-mode wireless device 100 is determined by comparing the monitored temperature with a threshold. If, as indicated by block 715, the monitored temperature exceeds the threshold, then the airlink mode is switched to a less power-intensive mode, as indicated by block 720. However, if the monitored temperature does not exceed the threshold, then the thermal sensors 157 continue to be monitored and a thermal condition determined as described above with regard to blocks 705, 710, etc. Note that, once switched to a less power-intensive airlink mode, the multi-mode wireless device 100 or circuit portions thereof may dissipate some of the excess heat.

Accordingly, the method can further include switching the mode back to a more power-intensive mode if it is determined that the heat has been dissipated. As indicated by block 725, at least one of the thermal sensors 157 is again monitored to sense the temperature. As indicated by block 730, a thermal condition indicating whether to switch the airlink mode of the multi-mode wireless device 100 is again determined by comparing the monitored temperature with a threshold. The threshold may be the same as that described above with regard to block 715 or may be a different threshold. If, as indicated by block 735, the monitored temperature is less than the threshold, then the airlink mode may be switched to a more power-intensive mode, as indicated by block 740. The mode to which the multi-mode wireless device 100 is switched may be the same as the mode from which it was switched previously, or it may be a different mode. However, if the monitored temperature continues to exceed the threshold, then the thermal sensors 157 continue to be monitored and a thermal condition determined as described above with regard to blocks 725, 730, etc.

Figure 8:
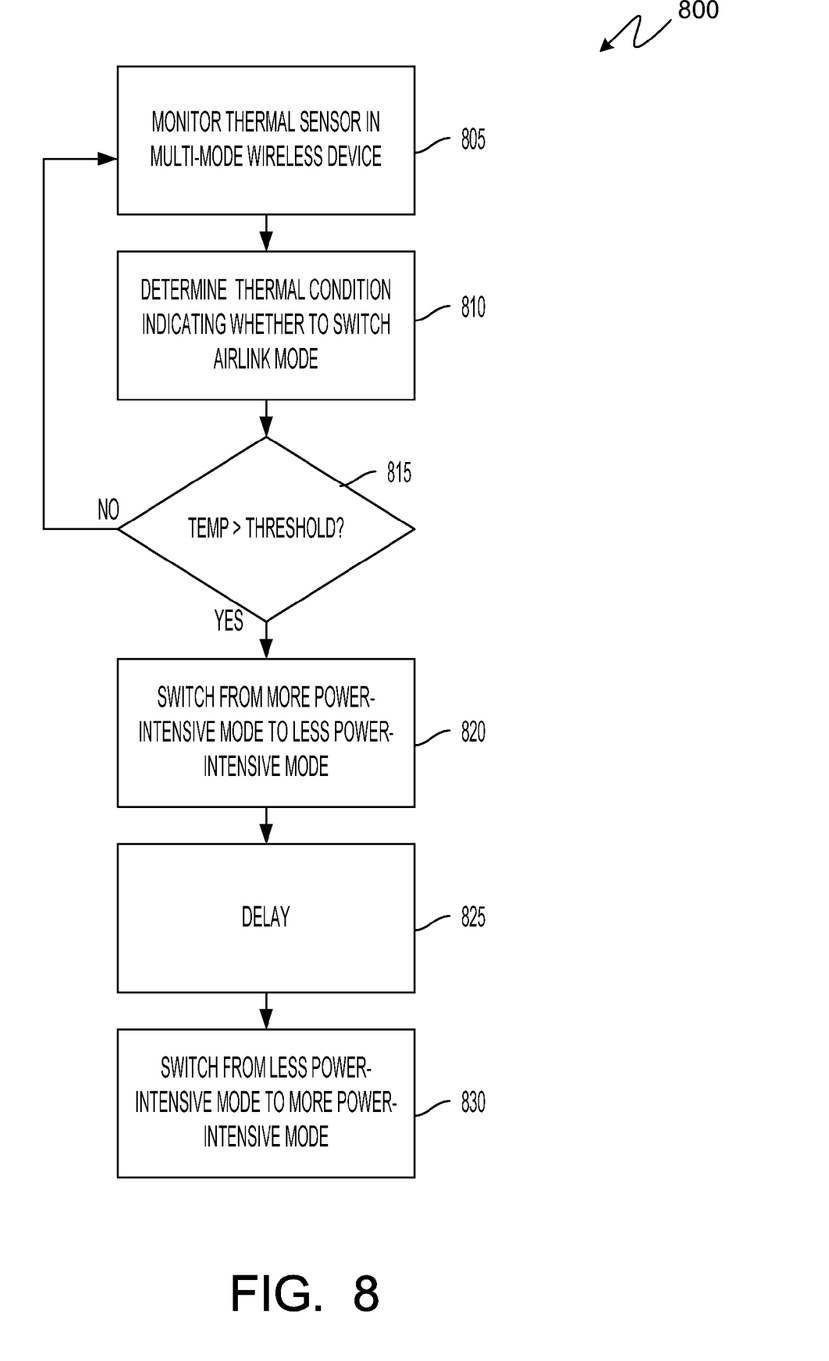
FIG. 8 is a flow diagram illustrating an exemplary method for switching to a less power-intensive airlink mode and switching back to a more power-intensive airlink mode in the multi-mode wireless device of FIG. 1 after a delay.

In FIG. 8, a flow diagram illustrating an exemplary method for switching to a less power-intensive airlink mode and switching back to a more power-intensive airlink is shown. As indicated by block 805, at least one of the thermal sensors 157 (FIG. 1) is monitored to sense a temperature. As indicated by block 810, a thermal condition indicating whether to switch the airlink mode of the multi-mode wireless device 100 is determined by comparing the monitored temperature with a threshold. If, as indicated by block 815, the monitored temperature exceeds the threshold, then the airlink mode is switched to a less power-intensive mode, as indicated by block 820. However, if the monitored temperature does not exceed the threshold, then the thermal sensors 157 continue to be monitored and a thermal condition determined as described above with regard to blocks 805, 810, etc. Note that, once switched to a less power-intensive airlink mode, the multi-mode wireless device 100 or circuit portions thereof may dissipate some of the excess heat. Accordingly, the method can further include switching the mode back to a more power-intensive mode if it is determined that the heat has been dissipated. As indicated by block 825, the mode may be switched back after a suitable time period or delay, such as, for example, a few seconds, during which time the multi-mode wireless device may dissipate heat. After the delay, the airlink mode may be switched to a more power-intensive mode, as indicated by block 830. The mode to which the multi-mode wireless device 100 is switched may be the same as the mode from which it was switched previously, or it may be a different mode. As with all the methods described herein, the method 800 may be repeated in a continual or loop-like manner, such that the thermal sensors 157 continue to be monitored and a thermal condition determined as described above with regard to blocks 805, 810, etc.

Figure 9:
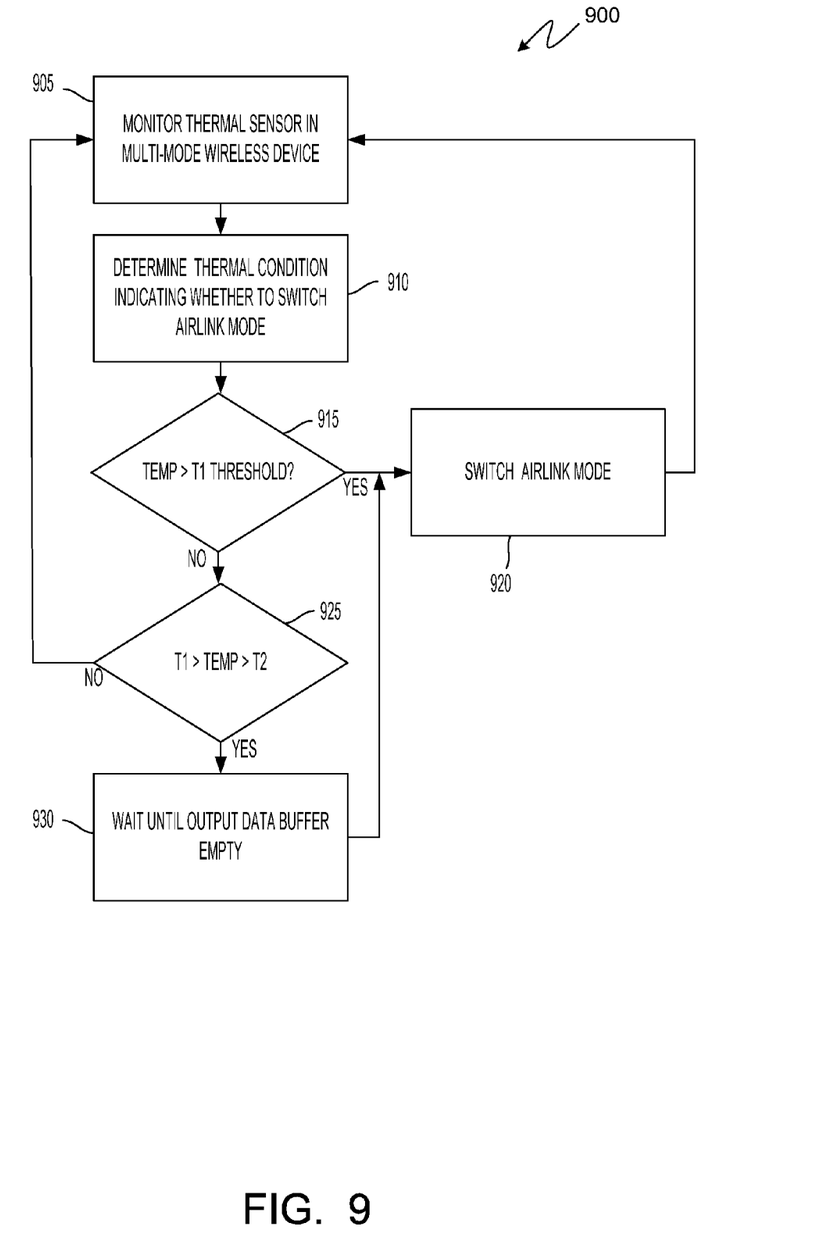
FIG. 9 is a flow diagram illustrating an exemplary method for airlink selection in response to both a monitored temperature and a non-thermal factor in the multi-mode wireless device of FIG. 1.

In FIG. 9, a flow diagram illustrating an exemplary method for airlink selection in response to both a monitored temperature and a non-thermal factor is shown. As indicated by block 905 in FIG. 9, at least one of the thermal sensors 157 (FIG. 1) is monitored to sense a temperature. As indicated by block 910, a thermal condition indicating whether to switch the airlink mode of the multi-mode wireless device 100 is determined by comparing the monitored temperature with a first threshold T1. If, as indicated by block 915, the monitored temperature exceeds the first threshold, then the airlink mode is switched to a less power-intensive mode, as indicated by block 920. The first threshold represents a relatively high threshold, above with the multi-mode wireless device 100 may be at imminent risk of damage or other detrimental effects of the excess heat. To minimize the likelihood of such damage, the mode may be switched without delay, as indicated by the direct flow from block 915 to block 920.

If the monitored temperature does not exceed the first threshold, then the monitored temperature is compared with both the first threshold T1 and a second threshold T2 that is lower than the first threshold to determine if the monitored temperature is less than the first threshold but greater than the second threshold, i.e., within a range between the first and second thresholds. The temperature range between the first and second thresholds represents a range in which the multi-mode wireless device 100 may be at lower risk of damage or other detrimental effects of the excess heat. If, as indicated by block 925, the monitored temperature is not between the first and second thresholds, i.e., the monitored temperature is less than or equal to the second threshold, then the thermal sensors 157 continue to be monitored and a thermal condition determined as described above with regard to blocks 905, 910, etc.

However, if the monitored temperature is between the first and second thresholds, representing only a moderate risk to the multi-mode wireless device 100, then mode switching can be deferred or delayed until, for example, an output data buffer of the multi-mode wireless device 100 has emptied, as indicated by block 930. As well understood by a person of ordinary skill in the art, the multi-mode wireless device 100 includes an output data buffer that buffers information in digital form before it is wirelessly transmitted. Such an output data buffer is not shown in the drawing figures for purposes of clarity but may be included in, for example, the RF transceiver 168 or as a software structure in the memory 112.

As further understood by one of ordinary skill in the art, if the rate at which information is transmitted exceeds the rate at which the CPU 110 processes data to be transmitted and provides it to the output data buffer, the output data buffer eventually empties. If the airlink mode is switched while the output data buffer contains data, such data may never be transmitted. Therefore, except in instances in which the multi-mode wireless device 100 may be at imminent risk of damage or other detrimental effects of the excess heat, it may be useful to allow the output data buffer to empty before switching the airlink mode, so that none of the data that the CPU 110 processes for transmission is lost.

Figure 10:
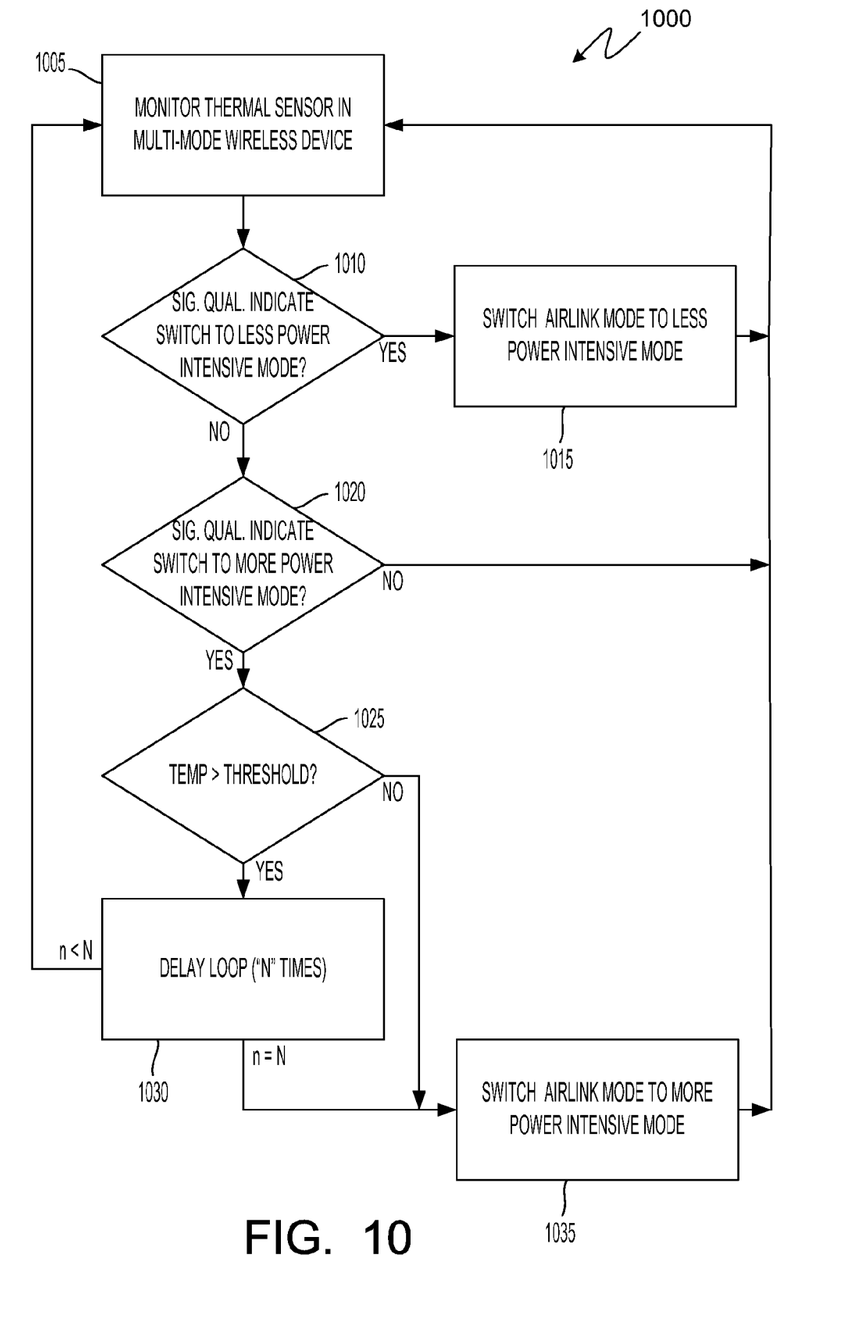
FIG. 10 is a flow diagram illustrating another exemplary method for airlink selection in response to both a monitored temperature and a non-thermal factor in the multi-mode wireless device of FIG. 1.

The condition of the output data buffer is an example of a non-thermal condition that may be an additional factor or input to the determination of whether to switch the airlink mode is made. Another example of such a non-thermal condition is the condition of the RF signal link. A flow diagram illustrating deferring switching from a less power-intensive mode to a more power-intensive mode until the monitored temperature decreases below a threshold is shown in FIG. 10. As indicated by block 1005, at least one of the thermal sensors 157 (FIG. 1) is monitored to sense a temperature. If, as indicated by block 1010, the mode control logic 292 (FIG. 2) determines that the RF signal link quality indicates that the mode is to be switched from a more power-intensive mode to a less power-intensive mode, then the airlink mode is switched to the less power-intensive mode, as indicated by block 1015.

However, if the mode control logic 292 determines that the RF signal link quality indicates that the mode is to be switched from a less power-intensive mode to a more power-intensive mode, then not only the RF signal link quality but also the thermal condition of the multi-mode wireless device 100 may be used as inputs to the airlink mode switching method, as indicated by block 1020. If, as indicated by block 1025, the monitored temperature does not exceed a threshold in an instance in which the mode is to be switched from a less power-intensive mode to a more power-intensive mode, then the airlink mode may be switched to the more power intensive mode, as indicated by block 1035.

However, if the monitored temperature exceeds the threshold in an instance in which the mode is to be switched from a less power-intensive mode to a more power-intensive mode, then the mode switching may be deferred or delayed by repeating the steps described above with regard to blocks 1005, 1010, etc. As indicated by block 1030, the process flow may loop N times (where N is an integer greater than one). At any time during such looping, the signal quality may improve such that mode control logic 292 determines that the mode is no longer to be switched to a more power-intensive mode (block 1010).

Alternatively, at any time during such looping, the monitored temperature may decrease below the threshold (block 1025). However, if the process completes N loops (indicated by a loop counter n) without either the signal quality improving sufficiently or the temperature decreasing sufficiently, then the airlink mode may nonetheless be switched to the more power-intensive mode, as indicated by block 1035. The above-described use of RF signal link quality as an additional factor or input in the mode switching determination is intended only as an example of how such a non-thermal condition may be included in the determination, and others will occur readily to the person of ordinary skill in the art in view of this example and other descriptions herein.

Although selected aspects have been illustrated and described in detail, it will be understood that various substitutions and alterations may be made therein without departing from the spirit and scope of the present invention, as defined by the following claims.

What is claimed is:

1. A method for temperature-driven airlink selection in a multi-mode wireless device operable to communicate with cellular base stations in any of a plurality of airlink modes, the method comprising:
   monitoring a temperature in the multi-mode wireless device while the multi-mode wireless device operates in a first airlink mode;
   determining a thermal condition indicating whether to switch the airlink mode of the multi-mode wireless device in response to the monitored temperature; and
   switching the multi-mode wireless device to operate in a second airlink mode in response to the thermal condition indicating to switch the airlink mode.

2. The method of claim 1, wherein operating the multi-mode wireless device in the second airlink mode is less power intensive than operating the multi-mode wireless device in the first airlink mode.

3. The method of claim 1, wherein operating the multi-mode wireless device in the second airlink mode is more power intensive than operating the multi-mode wireless device in the first airlink mode.

4. The method of claim 1, wherein:
   determining a thermal condition comprises determining that the monitored temperature increased above a threshold; and
   operating the multi-mode wireless device in the second airlink mode is more power intensive than operating the multi-mode wireless device in the first airlink mode.

5. The method of claim 4, further comprising switching the multi-mode wireless device to again operate in the first airlink mode in response to a determination that the monitored temperature no longer exceeds the threshold.

6. The method of claim 4, further comprising switching multi-mode wireless device to again operate in the first airlink mode at a predetermined time interval after switching the multi-mode wireless device to operate in the second airlink mode.

7. The method of claim 1, wherein switching the multi-mode wireless device to operate in a second airlink mode in response to the thermal condition indicating to switch the airlink mode comprises switching the multi-mode wireless device to operate in a second airlink mode in response to the thermal condition and further in response to at least one non-thermal condition.

8. The method of claim 7, wherein the at least one non-thermal condition comprises the status of a process relating to data transmission in the multi-mode wireless device.

9. The method of claim 8, wherein:
determining a thermal condition indicating whether to switch the airlink mode of the multi-mode wireless device comprises determining if the monitored temperature exceeds a first threshold but not a second threshold higher than the first threshold, and determining if the monitored temperature exceeds the second threshold; and
switching the multi-mode wireless device to operate in a second airlink mode comprises switching the multi-mode wireless device to operate in the second airlink mode if the monitored temperature exceeds the first threshold but not the second threshold and if a data buffer is empty, and switching the multi-mode wireless device to operate in the second airlink mode without regard to the data buffer if the monitored temperature exceeds the second threshold.

10. The method of claim 7, wherein the at least one non-thermal condition comprises radio frequency airlink quality.

11. The method of claim 10, further comprising deferring switching the multi-mode wireless device to operate in the second airlink mode until the monitored temperature decreases below a threshold, wherein operating the multi-mode wireless device in the second airlink mode is more power intensive than operating the multi-mode wireless device in the first airlink mode.

12. A system for temperature-driven airlink selection in a multi-mode wireless device operable to communicate with cellular base stations in any of a plurality of airlink modes, the system comprising:
a transceiver subsystem operable to wirelessly communicate information in a selected one of a plurality of airlink modes; and
a processor operable to:
monitor a temperature in the multi-mode wireless device while the multi-mode wireless device operates in a first airlink mode;
determine a thermal condition indicating whether to switch the airlink mode of the multi-mode wireless device in response to the monitored temperature; and
switch the multi-mode wireless device to operate in a second airlink mode in response to the thermal condition indicating to switch the airlink mode.

13. The system of claim 12, wherein operating the multi-mode wireless device in the second airlink mode is less power intensive than operating the multi-mode wireless device in the first airlink mode.

14. The system of claim 12, wherein operating the multi-mode wireless device in the second airlink mode is more power intensive than operating the multi-mode wireless device in the first airlink mode.

15. The system of claim 12, wherein:
the processor is operable to determine a thermal condition by being operable to determine that the monitored temperature increased above a threshold; and
operating the multi-mode wireless device in the second airlink mode is more power intensive than operating the multi-mode wireless device in the first airlink mode.

16. The system of claim 15, wherein the processor is operable to switch the multi-mode wireless device to again operate in the first airlink mode in response to a determination that the monitored temperature no longer exceeds the threshold.

17. The system of claim 15, wherein the processor is operable to switch multi-mode wireless device to again operate in the first airlink mode at a predetermined time interval after switching the multi-mode wireless device to operate in the second airlink mode.

18. The system of claim 12, wherein the processor is operable to switch the multi-mode wireless device to operate in a second airlink mode in response to the thermal condition and further in response to at least one non-thermal condition.

19. The system of claim 18, wherein the at least one non-thermal condition comprises the status of a process relating to data transmission in the multi-mode wireless device.

20. The system of claim 19, wherein:
the processor is operable to determine a thermal condition indicating whether to switch the airlink mode of the multi-mode wireless device by determining if the monitored temperature exceeds a first threshold but not a second threshold higher than the first threshold and by determining if the monitored temperature exceeds the second threshold; and
the processor is operable to switch the multi-mode wireless device to operate in a second airlink mode by switching the multi-mode wireless device to operate in the second airlink mode if the monitored temperature exceeds the first threshold but not the second threshold and if a data buffer is empty and by switching the multi-mode wireless device to operate in the second airlink mode without regard to the data buffer if the monitored temperature exceeds the second threshold.

21. The system of claim 18, wherein the at least one non-thermal condition comprises radio frequency airlink quality.

22. The system of claim 21, wherein the processor is further operable to defer switching the multi-mode wireless device to operate in the second airlink mode until the monitored temperature decreases below a threshold, and wherein operating the multi-mode wireless device in the second airlink mode is more power intensive than operating the multi-mode wireless device in the first airlink mode.

23. A system for temperature-driven airlink selection in a multi-mode wireless device operable to communicate with cellular base stations in any of a plurality of airlink modes, the system comprising:
means for monitoring a temperature in the multi-mode wireless device while the multi-mode wireless device operates in a first airlink mode;
means for determining a thermal condition indicating whether to switch the airlink mode of the multi-mode wireless device in response to the monitored temperature; and
means for switching the multi-mode wireless device to operate in a second airlink mode in response to the thermal condition indicating to switch the airlink mode.

24. The system of claim 23, wherein operating the multi-mode wireless device in the second airlink mode is less power intensive than operating the multi-mode wireless device in the first airlink mode.

25. The system of claim 23, wherein operating the multi-mode wireless device in the second airlink mode is more power intensive than operating the multi-mode wireless device in the first airlink mode.

26. The system of claim 23, wherein:
the means for determining a thermal condition comprises means for determining that the monitored temperature increased above a threshold; and
operating the multi-mode wireless device in the second airlink mode is more power intensive than operating the multi-mode wireless device in the first airlink mode.

27. The system of claim 26, further comprising means for switching the multi-mode wireless device to again operate in the first airlink mode in response to a determination that the monitored temperature no longer exceeds the threshold.

28. The system of claim 26, further comprising means for switching multi-mode wireless device to again operate in the first airlink mode at a predetermined time interval after switching the multi-mode wireless device to operate in the second airlink mode.

29. The system of claim 23, wherein the means for switching the multi-mode wireless device to operate in a second airlink mode in response to the thermal condition indicating to switch the airlink mode comprises means for switching the multi-mode wireless device to operate in a second airlink mode in response to the thermal condition and further in response to at least one non-thermal condition.

30. The system of claim 29, wherein the at least one non-thermal condition comprises the status of a process relating to data transmission in the multi-mode wireless device.

31. The system of claim 30, wherein:
the means for determining a thermal condition indicating whether to switch the airlink mode of the multi-mode wireless device comprises means for determining if the monitored temperature exceeds a first threshold but not a second threshold higher than the first threshold and means for determining if the monitored temperature exceeds the second threshold; and
the means for switching the multi-mode wireless device to operate in a second airlink mode comprises means for switching the multi-mode wireless device to operate in the second airlink mode if the monitored temperature exceeds the first threshold but not the second threshold and if a data buffer is empty, and means for switching the multi-mode wireless device to operate in the second airlink mode without regard to the data buffer if the monitored temperature exceeds the second threshold.

32. The system of claim 29, wherein the at least one non-thermal condition comprises radio frequency airlink quality.

33. The system of claim 32, further comprising means for deferring switching the multi-mode wireless device to operate in the second airlink mode until the monitored temperature decreases below a threshold, wherein operating the multi-mode wireless device in the second airlink mode is more power intensive than operating the multi-mode wireless device in the first airlink mode.

34. A computer program product comprising a non-transitory computer-usable medium having computer-readable program code embodied therein, the computer-readable program code adapted to be executed to implement a method temperature-driven airlink selection in a multi-mode wireless device operable to communicate with cellular base stations in any of a plurality of airlink modes, the method comprising:

monitoring a temperature in the multi-mode wireless device while the multi-mode wireless device operates in a first airlink mode;
determining a thermal condition indicating whether to switch the airlink mode of the multi-mode wireless device in response to the monitored temperature; and
switching the multi-mode wireless device to operate in a second airlink mode in response to the thermal condition indicating to switch the airlink mode.

35. The computer program product of claim 34, wherein operating the multi-mode wireless device in the second airlink mode is less power intensive than operating the multi-mode wireless device in the first airlink mode.

36. The computer program product of claim 34, wherein operating the multi-mode wireless device in the second airlink mode is more power intensive than operating the multi-mode wireless device in the first airlink mode.

37. The computer program product of claim 34, wherein:
determining a thermal condition comprises determining that the monitored temperature increased above a threshold; and
operating the multi-mode wireless device in the second airlink mode is more power intensive than operating the multi-mode wireless device in the first airlink mode.

38. The computer program product of claim 37, wherein the method implemented by execution of the computer-readable program code further comprises switching the multi-mode wireless device to again operate in the first airlink mode in response to a determination that the monitored temperature no longer exceeds the threshold.

39. The computer program product of claim 37, wherein the method implemented by execution of the computer-readable program code further comprises switching multi-mode wireless device to again operate in the first airlink mode at a predetermined time interval after switching the multi-mode wireless device to operate in the second airlink mode.

40. The computer program product of claim 34, wherein switching the multi-mode wireless device to operate in a second airlink mode in response to the thermal condition indicating to switch the airlink mode comprises switching the multi-mode wireless device to operate in a second airlink mode in response to the thermal condition and further in response to at least one non-thermal condition.

41. The computer program product of claim 40, wherein the at least one non-thermal condition comprises the status of a process relating to data transmission in the multi-mode wireless device.

42. The computer program product of claim 41, wherein:
determining a thermal condition indicating whether to switch the airlink mode of the multi-mode wireless device comprises determining if the monitored temperature exceeds a first threshold but not a second threshold higher than the first threshold, and determining if the monitored temperature exceeds the second threshold; and
switching the multi-mode wireless device to operate in a second airlink mode comprises switching the multi-mode wireless device to operate in the second airlink mode if the monitored temperature exceeds the first threshold but not the second threshold and if a data buffer is empty, and switching the multi-mode wireless device to operate in the second airlink mode without regard to the data buffer if the monitored temperature exceeds the second threshold.

43. The computer program product of claim 40, wherein the at least one non-thermal condition comprises radio frequency airlink quality.

44. The computer program product of claim 43, wherein the method implemented by execution of the computer-readable program code further comprises deferring switching the multi-mode wireless device to operate in the second airlink mode until the monitored temperature decreases below a threshold, wherein operating the multi-mode wireless device in the second airlink mode is more power intensive than operating the multi-mode wireless device in the first airlink mode.

* * * * *